(12) United States Patent
Thein et al.

(10) Patent No.: US 10,400,845 B2
(45) Date of Patent: Sep. 3, 2019

(54) SEALING/GUIDING UNIT

(71) Applicant: ZF FRIEDRICHSHAFEN AG, Friedrichshafen (DE)

(72) Inventors: Thomas Thein, Sennfeld (DE); Stefan Liehmann, Schweinfurt (DE); Wolfgang Breun, Niederwerrn (DE); Alexander Pass, Röthlein (DE); Michael Heinisch, Haßfurt (DE); Ingo Schau, Erlangen (DE); Uwe Gehringer, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 128 days.

(21) Appl. No.: 15/526,236

(22) PCT Filed: Oct. 12, 2015

(86) PCT No.: PCT/EP2015/073499
§ 371 (c)(1),
(2) Date: May 11, 2017

(87) PCT Pub. No.: WO2016/074869
PCT Pub. Date: May 19, 2016

(65) Prior Publication Data
US 2017/0328437 A1    Nov. 16, 2017

(30) Foreign Application Priority Data
Nov. 13, 2014 (DE) .................. 10 2014 223 164

(51) Int. Cl.
*F16F 9/36* (2006.01)
*F16F 9/32* (2006.01)

(52) U.S. Cl.
CPC ............ *F16F 9/362* (2013.01); *F16F 9/3242* (2013.01); *B60G 2206/41* (2013.01); *F16F 2230/0052* (2013.01); *F16F 2230/30* (2013.01)

(58) Field of Classification Search
CPC ....... F16F 9/362; F16F 9/3242; F16F 2230/30
See application file for complete search history.

(56) References Cited

U.S. PATENT DOCUMENTS 5,332,234 A * 7/1994 Forch ............... F16J 15/3216
277/576
5,531,299 A * 7/1996 Bataille ............... F16F 9/363
188/322.17
(Continued)

FOREIGN PATENT DOCUMENTS

DE    23 41 350    2/1975
DE    30 16 231    11/1981
(Continued)

*Primary Examiner* — Thomas J Williams
*Assistant Examiner* — James K Hsiao
(74) *Attorney, Agent, or Firm* — Cozen O'Connor

(57) ABSTRACT

A seal guide unit for guiding and sealing a piston rod of a vibration damper having a first guide element and a second guide element fixedly connected to the first guide element and arranged coaxial to the first guide element, and a radially moveable piston rod seal arrangement arranged coaxially between the two guide elements and is at least indirectly surrounded in circumferential direction by at least one guide element, including a defined radial annular gap, and comes in at least indirect axial contact with at least one guide element. The piston rod seal arrangement includes a piston rod seal and a sliding element which encloses the piston rod seal in circumferential direction and axially limits the piston rod seal at least on one side. The sliding element has a lower friction coefficient than parts of the seal guide unit adjoin the piston rod seal arrangement.

12 Claims, 3 Drawing Sheets

(56) References Cited

U.S. PATENT DOCUMENTS

| | | | | |
|---|---|---|---|---|
| 6,390,258 | B1* | 5/2002 | Hofmann | B60G 13/008 188/322.16 |
| 6,460,662 | B2* | 10/2002 | Niaura | F16F 9/365 188/267.1 |
| 6,510,930 | B2* | 1/2003 | Kime | B60G 13/008 188/322.17 |
| 6,840,358 | B2* | 1/2005 | Kos | F16F 9/362 188/321.11 |
| 6,883,649 | B2* | 4/2005 | Lun | F16F 9/3242 188/267 |
| 2001/0023638 | A1* | 9/2001 | Yamaguchi | F16F 9/363 92/165 R |
| 2005/0013020 | A1* | 1/2005 | Watling | F16F 9/3242 359/833 |
| 2005/0067242 | A1* | 3/2005 | Vanmechelen | F16F 9/3242 188/322.17 |
| 2007/0187199 | A1* | 8/2007 | Asa | F16F 9/0218 188/322.16 |
| 2015/0316119 | A1* | 11/2015 | Lehnen | F16F 9/362 384/16 |
| 2016/0305551 | A1* | 10/2016 | Koop | F04B 39/041 |

FOREIGN PATENT DOCUMENTS

| | | |
|---|---|---|
| DE | 82 01 327 | 6/1982 |
| DE | 31 17 493 | 11/1982 |
| DE | 41 31 197 | 4/1993 |
| DE | 199 30 964 | 3/2001 |
| DE | 101 41 214 | 3/2003 |
| DE | 10 2004 022 409 | 12/2005 |
| DE | 10 2013 204 745 | 1/2014 |
| EP | 1 596 095 | 11/2005 |
| EP | 2 280 198 | 2/2011 |
| JP | H07 4 462 | 1/1995 |
| JP | 2003 156 093 | 5/2003 |
| JP | 2007 205 435 | 8/2007 |

* cited by examiner

SEALING/GUIDING UNIT

CROSS REFERENCE TO RELATED APPLICATIONS

This is a U.S. national stage of application No. PCT/EP2015/073499, filed on Oct. 12, 2015. Priority is claimed on German Application No. DE102014223164.7, filed Nov. 13, 2014, the content of which is incorporated here by reference.

BACKGROUND OF THE INVENTION

1. Field of the Invention

The invention is directed to a seal guide unit for guiding and sealing a piston rod of a vibration damper in a motor vehicle.

2. Description of the Prior Art

A seal guide unit of this type is known, for example, from DE8201327U1. It comprises a first guide element and a second guide element fixedly connected to the first guide element and arranged coaxial to the first guide element with respect to a center axis of the seal guide unit. A radially moveable piston rod seal is arranged between the two guide elements coaxial to the two guide elements and is directly surrounded in circumferential direction by the upper guide element referring to the sole figure. The piston rod seal comes in direct axial contact with the upper guide element and at least in indirect axial contact with the lower guide element via a further component part.

It is an object of a seal guide unit that a piston rod penetrating into a damper tube of a vibration damper is to be positioned radially relative to the damper tube and the piston rod is to be guided when moving into the damper tube and when moving out of the damper tube and a tilting of the piston rod relative to the damper tube is accordingly to be prevented. Because the vibration dampers generally contain a liquid or gaseous damping medium in the interior of the damper tube, the piston rod should be sealed to prevent the uncontrolled escape of damping medium from the cylinder tube. This task is taken over by the piston rod seal. If the vibration damper is employed at different outside temperatures, the above-described tightness can be ensured only with great difficulty. At very low temperatures, the elasticity of the piston rod seal possibly declines very severely. When a lateral load is introduced, the piston rod makes a minimal radial displacement and is minimally radially deformed. Because of the reduced elasticity, the piston rod seal cannot follow this radial path of the piston rod or return to the original shape fast enough. Accordingly, the development of leakiness at low temperatures cannot be prevented.

DE 199 30 964 A1 discloses a piston rod seal arranged in the seal guide unit so as to be radially moveable and which can accordingly follow a radial movement of the piston rod. A disadvantage of this design is that it is very complicated and comprises many individual parts, which makes assembly considerably more difficult and necessitates an increased assembly time.

SUMMARY OF THE INVENTION

It is an object of one aspect of the present invention to further develop the generic seal guide unit in such a way that the disadvantages described above are overcome and assembly is facilitated.

The piston rod seal arrangement comprises a piston rod seal and a sliding element that encloses the piston rod seal in circumferential direction and which axially limits the piston rod seal at least on one side, and the sliding element has at least partially a lower friction coefficient than the other individual parts of the seal guide unit which directly axially adjoin the piston rod seal arrangement and which are in frictional contact with the sliding element.

Therefore, the piston rod seal cannot rest against an outer wall of the seal guide unit and be deformed during a further radial movement of the piston rod. The piston rod seal arrangement follows every radial movement of the piston rod, and the shape of the piston rod seal is always preserved by the sliding element.

It can be provided that the sliding element comes in direct axial contact with the guide element on at least one side. However, it can also be advantageous to arrange a further component part between the sliding element and the guide element. In this way, the sliding element can have a lower friction coefficient than the directly axially adjoining component part and/or guide element.

According to a further advantage, the sliding element can have an additional friction-reducing coating. This coating can also be carried out at the guide element or at a further component part which directly adjoins the sliding element and is in frictional contact with the sliding element.

The sliding element can be made of plastic or metal.

According to a further advantage, it can be provided that the sliding element is made from sheet metal by a stamping process and/or a deforming process.

BRIEF DESCRIPTION OF THE DRAWINGS

The invention will be described more fully referring to the following figures.

In the drawings.

DETAILED DESCRIPTION OF THE PRESENTLY PREFERRED EMBODIMENTS

Figure 1:
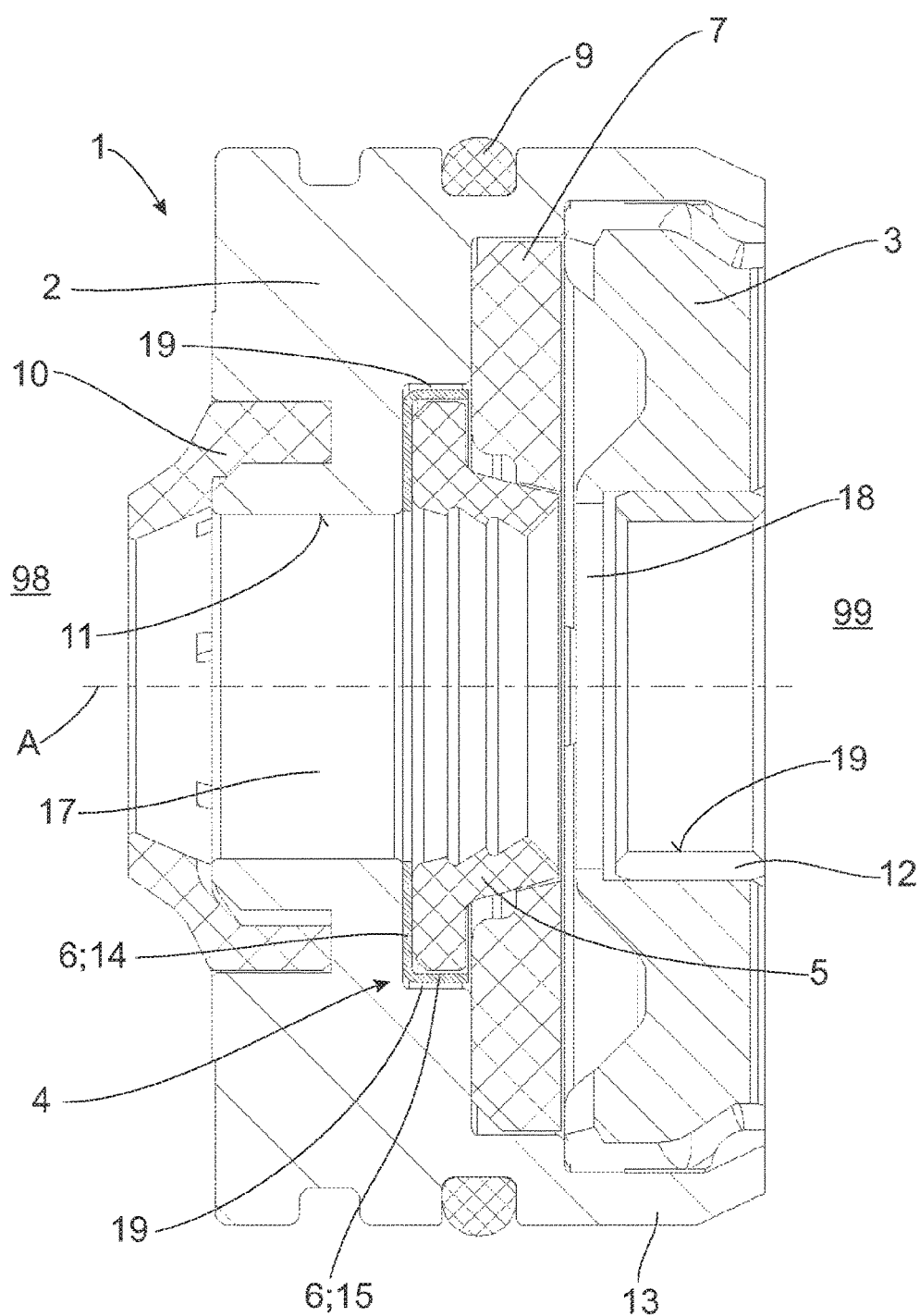
FIG. 1 is a sectional view of an exemplary variant of a seal guide unit.

As a general rule, the seal guide unit 1 closes one end of a damper tube of a vibration damper. The damper tube is not shown in the drawings. However, in order to illustrate the position of the individual elements of the damping guide unit in the installed condition, the side facing the interior of the damper tube is designated by reference numeral 99 and the side remote of the interior of the damper tube is designated by reference numeral 98 in all of the figures.

First, an exemplary variant of a seal guide unit 1 for guiding and sealing a piston rod of a vibration damper in a motor vehicle according to patent claim 1 is shown in a sectional view in FIG. 1.

The seal guide unit 1 comprises a first guide element 2, a second guide element 3, and a piston rod seal arrangement 4 arranged axially between the two guide elements 2; 3.

Arranged at the side 98 of the first guide element 2, remote of the damper tube interior, is a scraper 10 whose task it is to strip diverse contaminants from the surface of the piston rod and to prevent contaminants from entering the damper tube interior.

The outer seal 9, which encloses the seal guide unit 1 in circumferential direction, seals the latter from the damper tube, not shown.

The first guide element 2 has a fastening portion 13 on the side 99 facing the damper tube interior. The second guide element 3 is arranged inside the fastening portion 13 of the first guide element 2 and is fixated through the at least partial deformation of the fastening portion 13. Accordingly, the second guide element 3 is arranged coaxial to the first guide element 2 with reference to a center axis A of the seal guide unit 1 and is fixedly connected to the first guide element 2. The piston rod seal arrangement 4 is arranged between the two guide elements 2; 3 and coaxial to the two guide elements 2; 3 and is radially moveable owing to the radial annular gap 19 surrounding the piston rod guide arrangement 4 in circumferential direction. In the variants shown in FIGS. 1 to 3, the piston rod seal arrangement 4 is surrounded in circumferential direction by the first guide element 2 and comes in axial contact with the guide element 2 on its side remote of the damper tube interior. The piston rod seal arrangement 4 comprises a piston rod seal 5 and a sliding element 6 that encloses the piston rod seal 5 in circumferential direction and axially limits the piston rod seal 5 at least on one side.

On the side of the piston rod guide 4 facing the damper tube interior, between the piston rod guide 4 and the second guide element 3 is arranged a further component part 7 whose object is to ensure a constant radial pressing pressure of the piston rod seal 5 against the piston rod, not shown here, and to prevent the escape of damping medium from the damper tube interior. The sliding element 6 has a radially extending first disk-shaped portion 14 and an axially extending tubular portion 15 adjoining the latter, the piston rod seal 5 being received by the sliding element 6 such that the piston rod seal 5 is axially supported at the first disk-shaped portion 15 and radially supported at the tubular portion 15 of the sliding element 6.

To ensure a guiding of the piston rod, the first guide element 2 has a bore 17 radially defined by guide surface 11. The second guide element 3 has a bore 18 likewise formed for a problem-free guiding of the piston rod. Bore 18 is constructed as a stepped bore hole, and the step with the larger diameter receives a guide bushing 12. The guide bushing 12 has a guide surface 19 which is typically hardened or coated so as to promote sliding.

The sliding element 6 has a lower friction coefficient than the directly axially adjoining guide element 2 so that a radial movement of the piston rod seal arrangement is ensured. Alternatively or in addition, the component part 7 can be made of a material with a higher or lower friction coefficient than the friction coefficient of the sliding element 6.

The sliding element 6 can also have a friction-reducing coating, for example. For example, the coating can comprise graphite or PTFE at least in part. Alternatively, the sliding element 6 can also be treated by a hard anodic coating process to achieve a hard, smooth surface.

Figure 2:
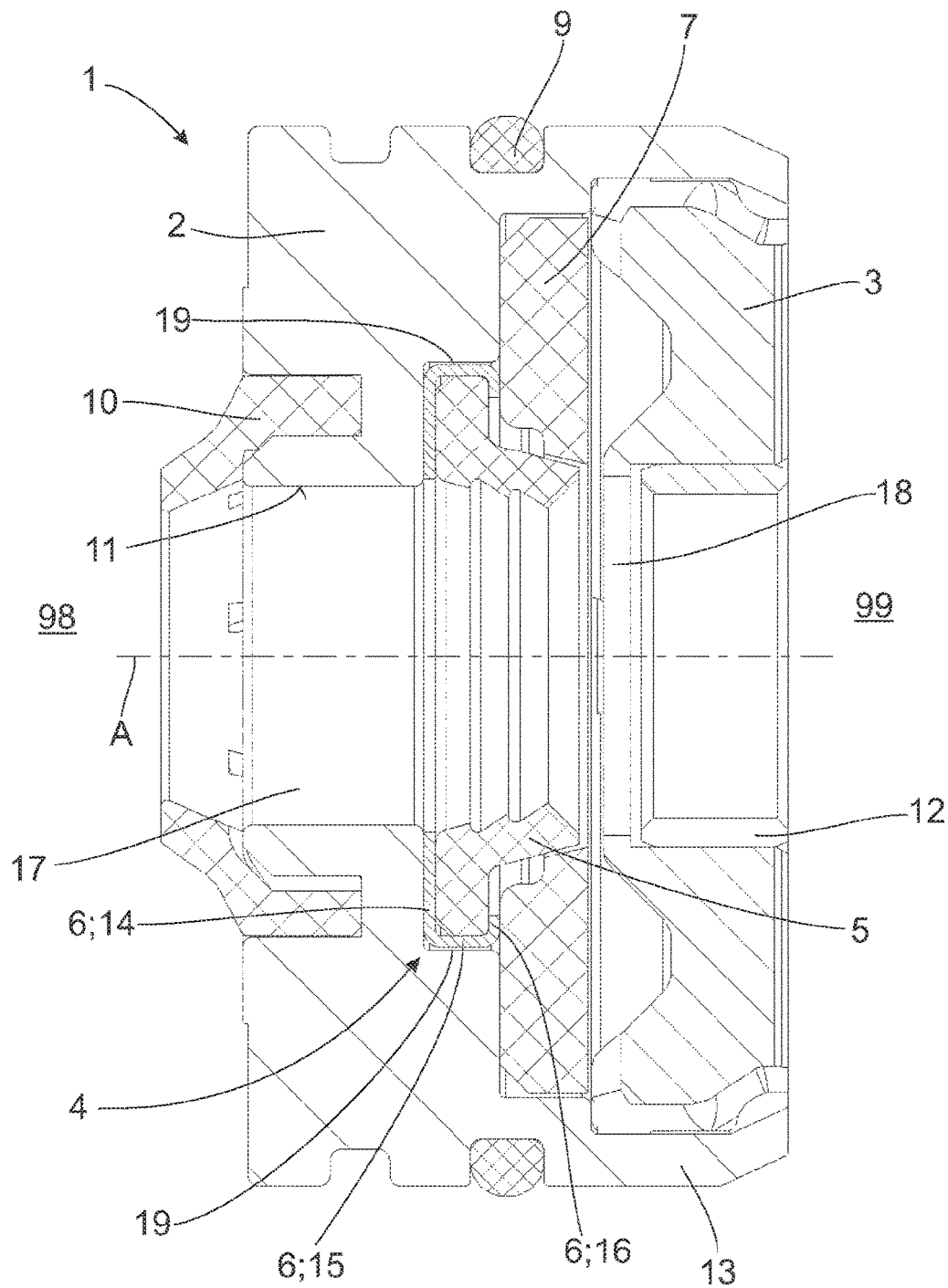
FIG. 2 is a sectional view of a further exemplary variant of a seal guide unit.
Figure 3:
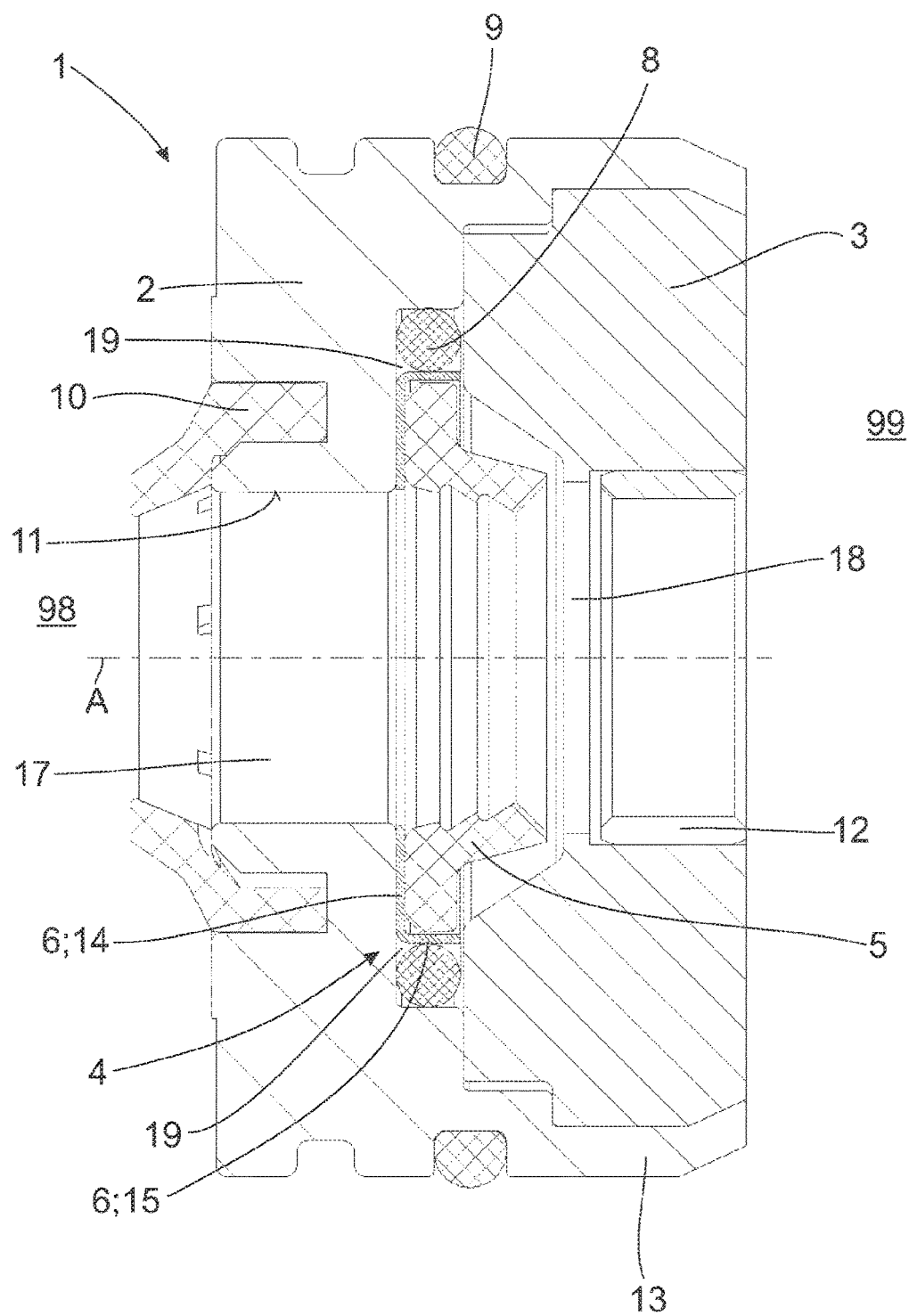
FIG. 3 is a sectional view of a further exemplary variant of a seal guide unit.

The friction-reducing coating can also be carried out at the guide element 2; 3 or at another component part 8 directly adjoining the sliding element 6. The sliding element 6 shown in FIGS. 1 to 3 is made of a metal, particularly of a sheet metal by a stamping process and/or a deformation process. Of course, the sliding element can also be made of a plastic.

When the sliding element 6 has a lower friction coefficient than the individual parts, e.g., the guide element 2; 3 or additional component parts 7, which directly axially adjoin the sliding element 6, the surface of these individual parts which is in frictional contact with the sliding element 6 can be formed in a defined manner so as to be rough. In this way, lubricating pockets are formed between the sliding element 6 and the surface of the individual parts, which lubricating pockets receive the damping medium, which additionally reduces friction force.

At least one difference between FIG. 1 and FIG. 2 is that in FIG. 2 the sliding element 6 has a second radially extending disk-shaped portion 16 constructed so as to adjoin the tubular portion 15 and is arranged between the piston rod seal 5 and the component part 7. In this way, the piston rod seal 5 is held radially in its radially outer area and axially on both sides.

FIG. 3 shows a further variant which no longer requires a component part 7 to prevent the escape of damping medium from the damper tube interior. This task is taken over by the seal element 8 constructed as a sealing ring, is arranged inside the radial annular gap 19 and encloses the piston rod guide arrangement 4 in circumferential direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A seal guide unit configured to guide and seal a piston rod of a vibration damper in a motor vehicle, comprising:
    a first guide element;
    a second guide element fixedly connected to the first guide element and arranged coaxial to the first guide element with respect to a center axis of the seal guide unit; and
    a radially moveable piston rod seal arrangement arranged between the first guide element and the second guide element coaxial to the at least one of the first guide element and the second guide element and is at least indirectly surrounded in circumferential direction by at least one of the first guide element and the second guide element, including a defined radial annular gap, and comes in at least indirect axial contact with at least one of the first guide element and the second guide element, the piston rod seal arrangement comprises:
        a piston rod seal; and
        a sliding element that encloses the piston rod seal in circumferential direction and axially limits the piston rod seal at least on one side,
    wherein the sliding element has, at least partially, a lower friction coefficient than at least the first guide element of the seal guide unit that the sliding element directly axially adjoins.

2. The seal guide unit according to claim 1, wherein sliding element comes in direct axial contact with at least one of the first guide element and the second guide element on at least one side.

3. The seal guide unit according to claim 2, wherein the at least one of the first guide element and the second guide element has a friction-reducing coating.

4. The seal guide unit according to claim 1, wherein a further component part is arranged between the sliding element and the at least one of the first guide element and the second guide element.

5. The seal guide unit according to claim 4, wherein the sliding element has a lower friction coefficient than a directly axially adjoining portion of the component part and/or the at least one of the first guide element and the second guide element.

6. The seal guide unit according to claim 4, wherein the component part which directly adjoins the sliding element has a friction-reducing coating.

7. The seal guide unit according to claim 1, wherein the sliding element has a friction-reducing coating.

8. The seal guide unit according to claim 1, wherein the sliding element is made of plastic.

9. The seal guide unit according to claim 1, wherein the sliding element is made of metal.

10. The seal guide unit according to claim 1, wherein the sliding element is made from sheet metal by at least one of a stamping process and a deforming process.

11. The seal guide unit according to claim 1, wherein the sliding element has, at least partially, a lower friction coefficient than at least the second guide element of the seal guide unit.

12. The seal guide unit according to claim 11, wherein the sliding element has, at least partially, a lower friction coefficient than an additional part of the seal guide unit, which is arranged axially between the first guide element and the second guide element.

* * * * *